United States Patent [19]

Watanabe et al.

[11] Patent Number: 5,086,231

[45] Date of Patent: Feb. 4, 1992

[54] MICROFILM RETRIEVAL SYSTEM FOR RETRIEVING A DESIGNATED IMAGE FRAME

[75] Inventors: Izumi Watanabe; Tetsuya Takamori; Kenji Yokota; Takashi Yamaguchi, all of Kanagawa, Japan

[73] Assignee: Fuji Photo Film Co., Ltd., Kanagawa, Japan

[21] Appl. No.: 509,436

[22] Filed: Apr. 16, 1990

[30] Foreign Application Priority Data

Apr. 19, 1989 [JP] Japan .................................. 1-99612

[51] Int. Cl.⁵ .......................................... G06K 7/015
[52] U.S. Cl. .................... 250/557; 250/570; 353/26 A
[58] Field of Search .............. 250/557, 570; 353/25, 353/26 A, 27 A

[56] References Cited

U.S. PATENT DOCUMENTS

| | | | |
|---|---|---|---|
| 3,937,927 | 2/1976 | Weigert | 353/26 A |
| 4,514,641 | 4/1985 | Tanaka et al. | 250/557 |
| 4,607,950 | 8/1986 | Ishii et al. | 250/570 |
| 4,687,321 | 8/1987 | Itoh | 250/570 |

Primary Examiner—David C. Nelms
Assistant Examiner—S. Allen
Attorney, Agent, or Firm—Sughrue, Mion, Zinn, Macpeak & Seas

[57] ABSTRACT

A microfilm retrieval system includes blip marks provided at transversely opposite side portions of selected image frames of an elongated microfilm, a device for detecting the blip marks, counters for counting the number of blip marks in accordance with kinds of blip marks, respectively, a device for determining a specific combination of the kinds of blip marks when two or more kinds of blip marks are provided to selected the image frames, and a controller for controlling the counters such that the blip marks are counted with a unit of count and a reset value corresponding to the specific combination of marks determined by the determining device. The unit of count and the reset value at the time of counting blip marks can be set to desired numerical values, and counting is effected by making a page number or the like provided on a photographed object coincide with a count value, thereby facilitating retrieval.

20 Claims, 8 Drawing Sheets

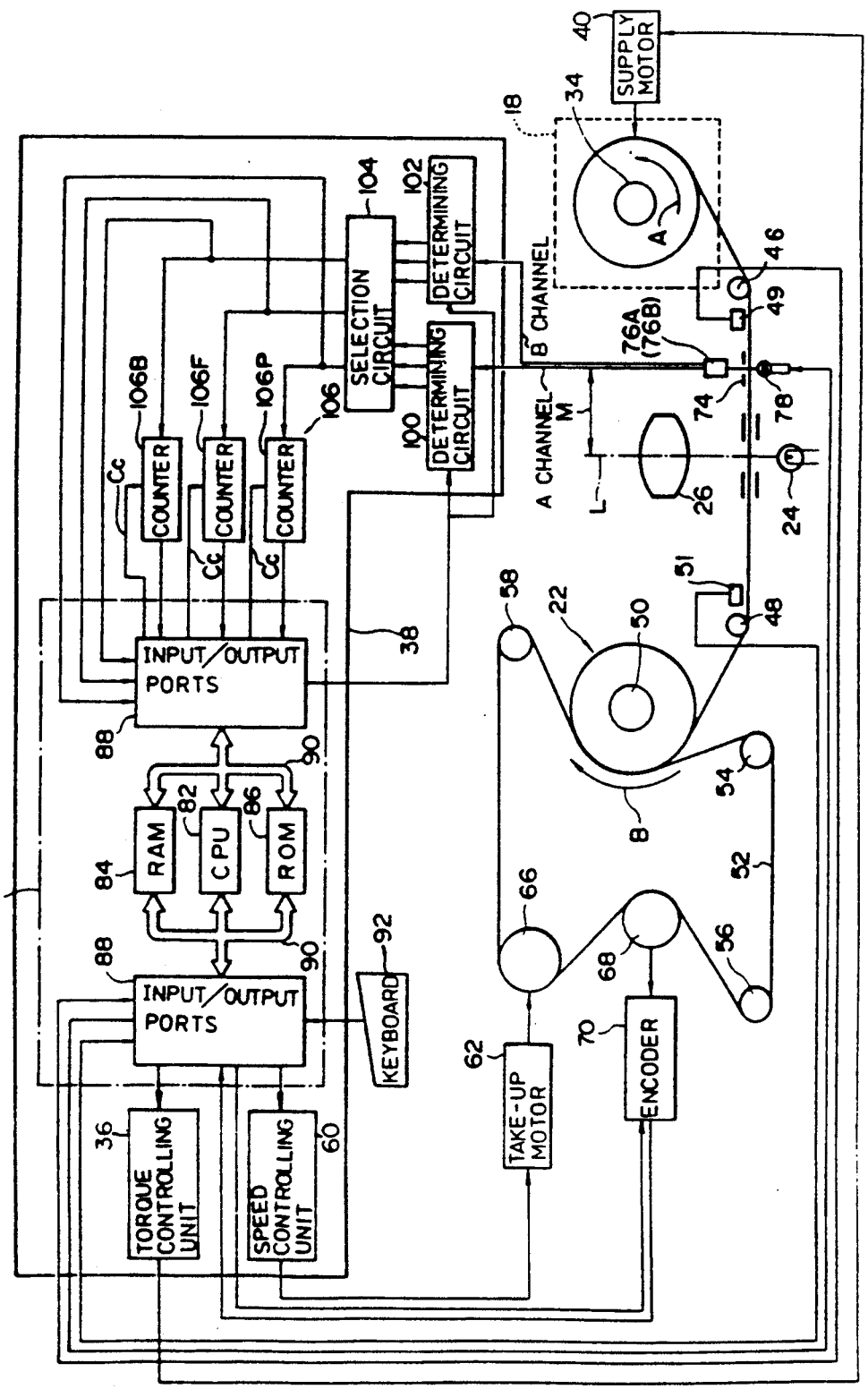

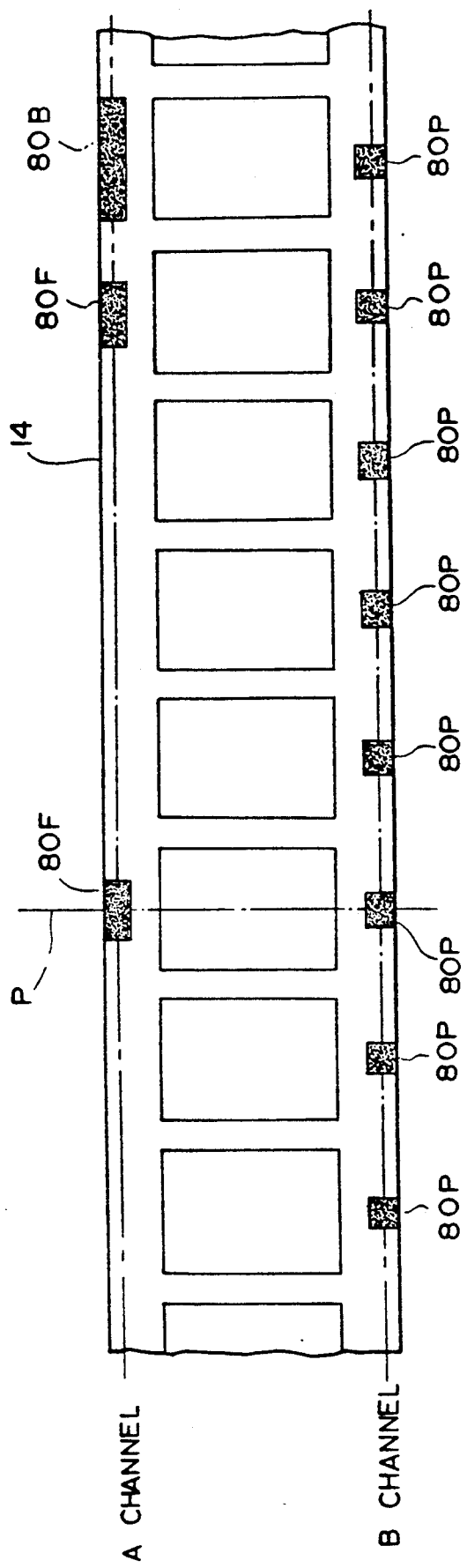

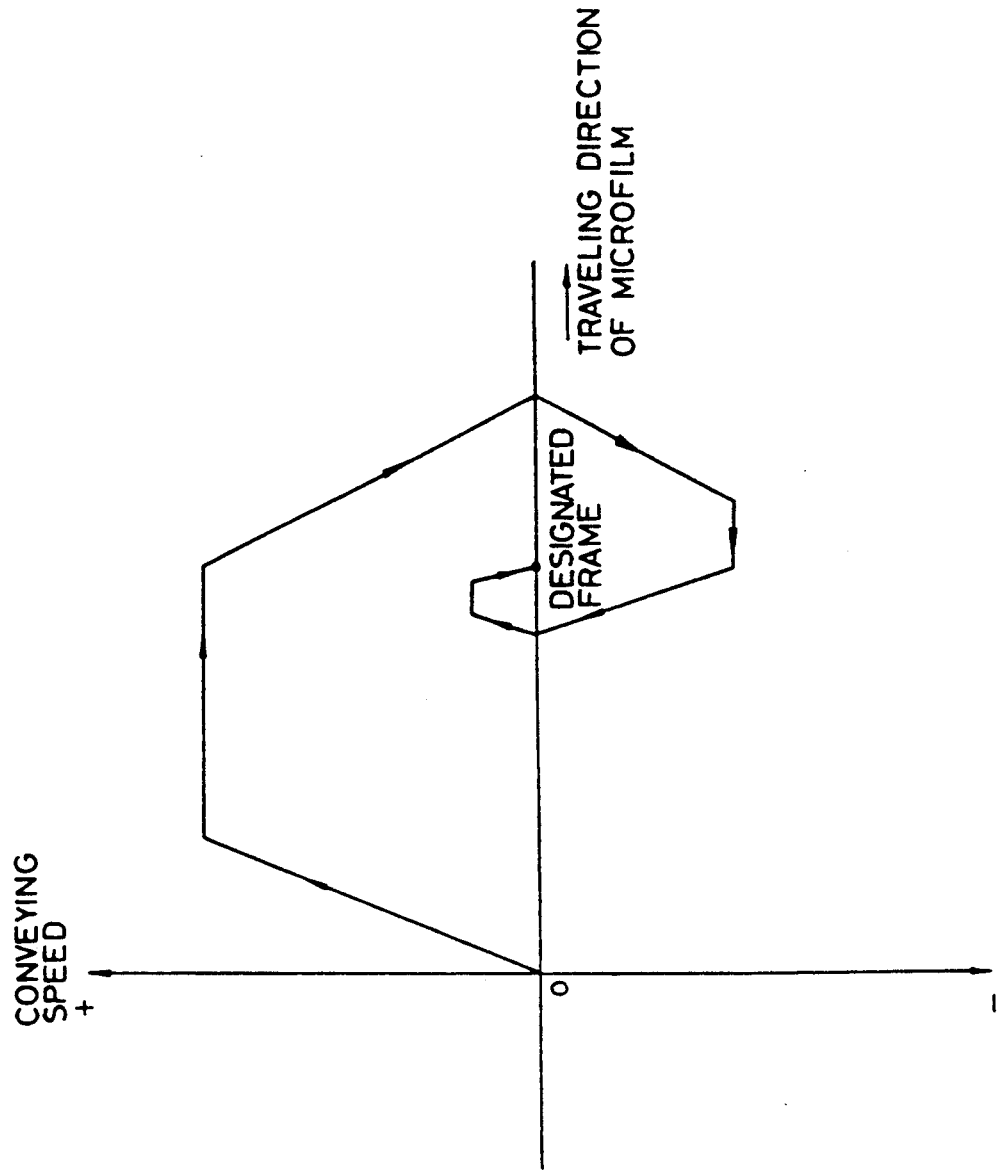

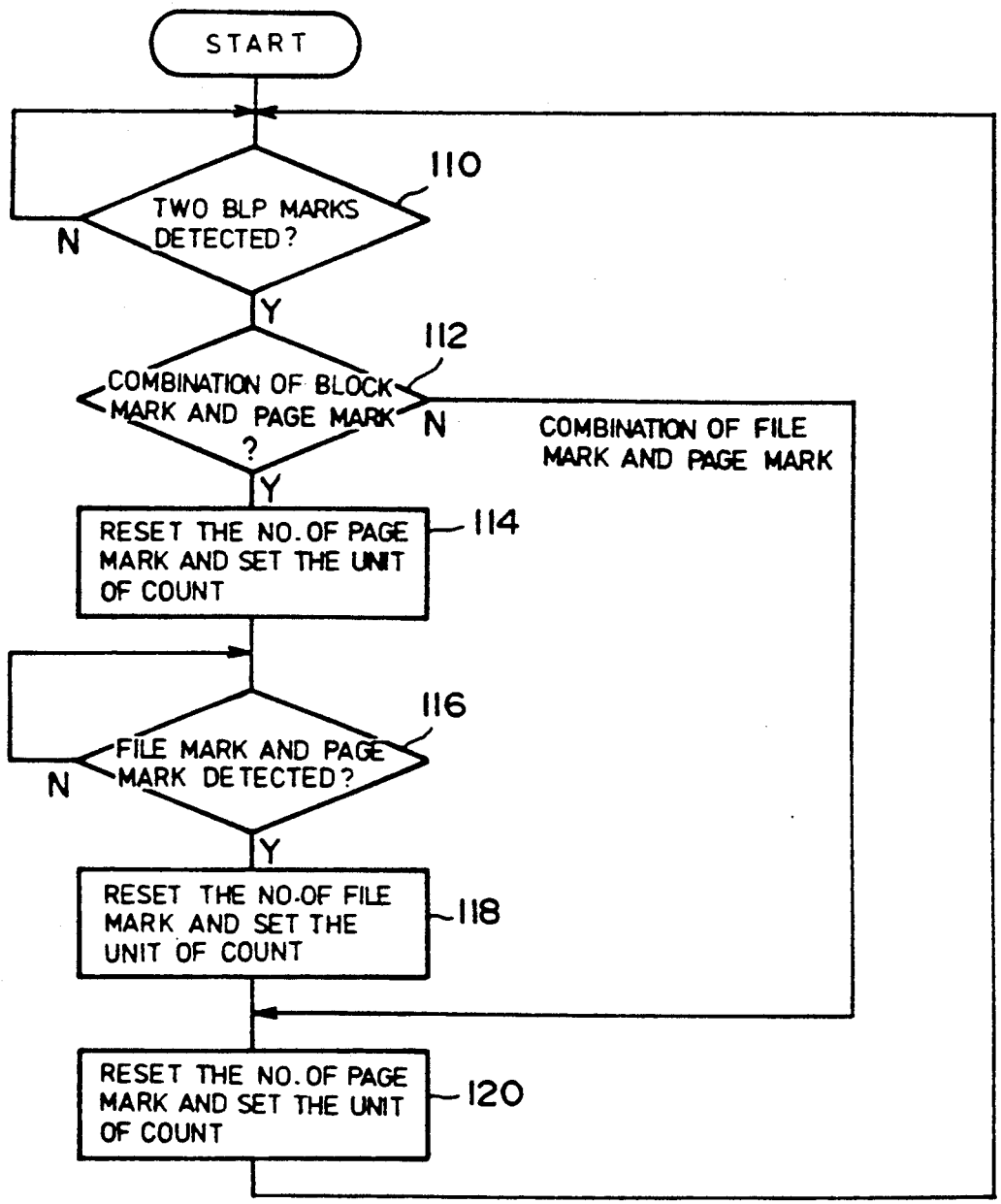

MICROFILM RETRIEVAL SYSTEM FOR RETRIEVING A DESIGNATED IMAGE FRAME

BACKGROUND OF THE INVENTION

1. Field of the Invention

The present invention relates to a microfilm retrieval system for retrieving a designated image frame by detecting blip marks assigned to each image frame of an elongated microfilm on which recording has been carried out.

2. Description of the Related Art

Generally, on an elongated microfilm taken up onto a reel in the form of a roll, marks of a small width, called blip marks, are provided in the vicinity of respective image frames of the microfilm onto which images have been recorded and in correspondence with each image frame. Since one kind of blip mark for each image frame is usually allocated to each page of a document, this kind of mark will be hereinafter referred to as a page mark.

In addition, in the image frames of a microfilm, there are cases where related contents are recorded continuously in a plurality of image frames (e.g., in the case of the entire text of a patent specification). To classify such related image frames, there are cases where blip marks are assigned having a slightly larger width than page marks. This kind of mark for each related image frame will be hereinafter referred to as a file mark. Furthermore, there are cases where files having the aforementioned related contents are classified into each field (e.g., a patent specification and related technological documents, Part 1 and Part 2 of a book). Thus, in order to classify the document into a plurality of related files, there are cases where blip marks having a still larger width are assigned in addition to the file marks and page marks. Hereinafter, this kind of mark for each of a plurality of files will be referred to as a block mark.

Blip marks (page marks, file marks, and block marks) are respectively given to transversely opposite side portions of the microfilm, and mark detection sensors of a microfilm retrieval system are disposed in correspondence with the positions of the opposite side portions of the microfilm. The microfilm retrieval system retrieves an object frame by retrieving blip marks while conveying the microfilm.

In retrieval, the operator can designate a block mark, a file mark, and a page mark by inputting predetermined numerical values by a keyboard. For instance, if the number "3" is input to designate a block mark, it means that a leading page of a third block has been designated.

After the marks are designated, the microfilm is conveyed in its longitudinal direction, a block mark of a third count is detected, and the microfilm is then stopped. If an image frame is retrieved in this manner, retrieval is facilitated as compared with a case where retrieval is effected by counting each page mark from the very beginning of the microfilm. The result is that retrieval time is shortened.

In the microfilm retrieval system, a retrieved image frame is positioned at the position of an optical axis for projecting the image onto a screen. The image is then projected in enlarged form. In addition, it is possible to make a copy of the image being projected.

With the above-described conventional art, however, the counting of the blip marks is effected independently for each kind of blip marks. For example, when it is desirous to retrieve a predetermined file or page concerning a designated block mark, it is necessary to designate a file or page after a leading image frame to which that block mark is assigned has been positioned.

In addition, in the case of a microfilm on which one book has been photographed in sequence from the beginning to the end, there are cases where retrieval is effected by looking at the pages provided in the book. In this case, retrieval is possible if the pages in the book are sequential. However, in cases where a first page of each chapter is reset to "1", i.e., each chapter begins with page number "1", the page number provided in the book does not coincide with the count of page marks counted for each image frame, thereby making retrieval difficult (as an example of the aforementioned type of book, it is possible to cite "Electronic Engineering Pocket Book, 3rd Edition, compiled by the Committee for Compilation of Electronic Pocket Book and published by OHMSHA, LTD.").

SUMMARY OF THE INVENTION

Accordingly, it is an object of the present invention to provide a microfilm retrieval system in which a reset value (i.e., an initial value) and a unit of count at the time of counting blip marks can be set to desired numerical values, and effecting counting by making a page number or the like provided on a photographed object coincide with a count value, thereby facilitating the retrieval.

To this end, in accordance with the present invention, a microfilm retrieval system is provided for retrieving a designated image frame by counting the number of blip marks given on an elongated microfilm in correspondence with each of a plurality of image frames recorded on the microfilm from a set initial value in a set unit of count in accordance with the kind of blip mark, the microfilm retrieval system comprising: specific mark detecting means for detecting at least one specific kind of blip mark which is provided at a predetermined position of the microfilm and is used for determining at least one of the initial value and the unit of count; means for detecting a combination of specific kinds of blip marks in cases where two or more specific kinds of blip marks are provided; and means for setting the initial value and the unit of count corresponding to the combination of specific blip marks detected by the means for detecting a combination of specific kinds of blip marks.

In accordance with the present invention, when blip marks are counted, counting can be started with a desired reset value (e.g., "0" or "1") for determining an initial value of count, so that the counted value can be made to coincide with a leading page of the photographed object.

In addition, in cases where two pages are photographed on one image page, if the unit of count is set to "+2", the counted values are incremented by +2 for each page mark, so that the counted value can be made to coincide with the page on the photographed object.

Furthermore, in the count controlling device each time a combination of specific blip marks is detected, the blip marks can be counted with a unit of count and a reset value corresponding to the combination of the specific blip marks, so that the blip marks can be counted in correspondence with respective photographed objects for which page numbers are allotted in different manners on one microfilm.

The above and other objects, features and advantages of the present invention will become more apparent from the following detailed description of the invention when read in conjunction with the accompanying drawings.

BRIEF DESCRIPTION OF THE DRAWINGS

FIG. 2B is a block diagram schematically illustrating the vicinity of the cartridge loading section;

FIG. 3 is a top plan view illustrating an example of a microfilm provided with blip marks;

FIG. 4 is a diagram explaining speed control for effecting the position of an image frame.

DESCRIPTION OF THE PREFERRED EMBODIMENTS

Figure 1:
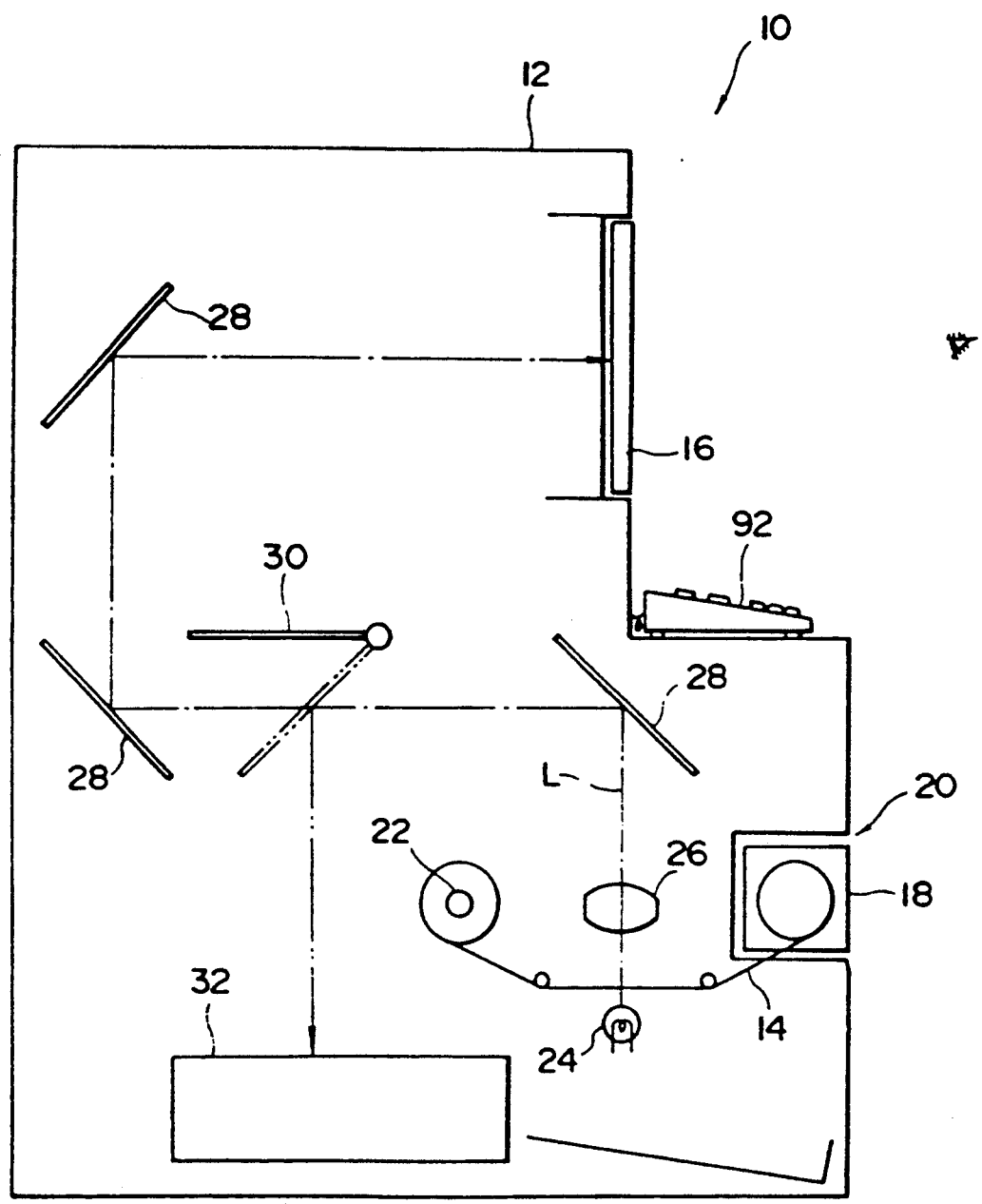
FIG. 1 is a diagram schematically illustrating a reader printer in accordance with an embodiment of the present invention.

FIG. 1 illustrates a reader-printer 10 (microfilm retrieval system) in accordance with this embodiment. In the reader-printer 10, a screen 16 for projecting an image recorded on a microfilm 14 onto it is disposed in a front surface (right-hand surface in FIG. 1) of a casing 12 of the reader-printer 10. A cartridge 18, in which the microfilm 14 is accommodated in roll form, is loaded in a loading section 20 disposed slightly below the screen 16. An end of the microfilm 14 within the cartridge 18 has been taken up onto a takeup reel 22 inside the retrieval system. A light source 24 is interposed between the cartridge 18 and the takeup reel 22 in such a manner as to apply light onto the microfilm 14. A beam of light applied from this light source 24 is transmitted through an image frame disposed on an optical axis L, and projected onto the screen 16 via an optical system constituted by a lens 26 and a plurality of reflecting mirrors 28. Thus, it is possible to project the image recorded on the microfilm 14 in enlarged form.

By changing a direction of reflection of the optical system (e.g., by arranging a mirror 30 in such a manner as to be capable of being moved into and away from the optical axis L, as shown by a two-dot chain line in FIG. 1), the transmitted image can be reflected toward a copier 32 disposed in the lower portion of the retrieval system. In the copier 32, an image recorded on microfilm 14 can be copied in enlarged form.

Figure 2A:
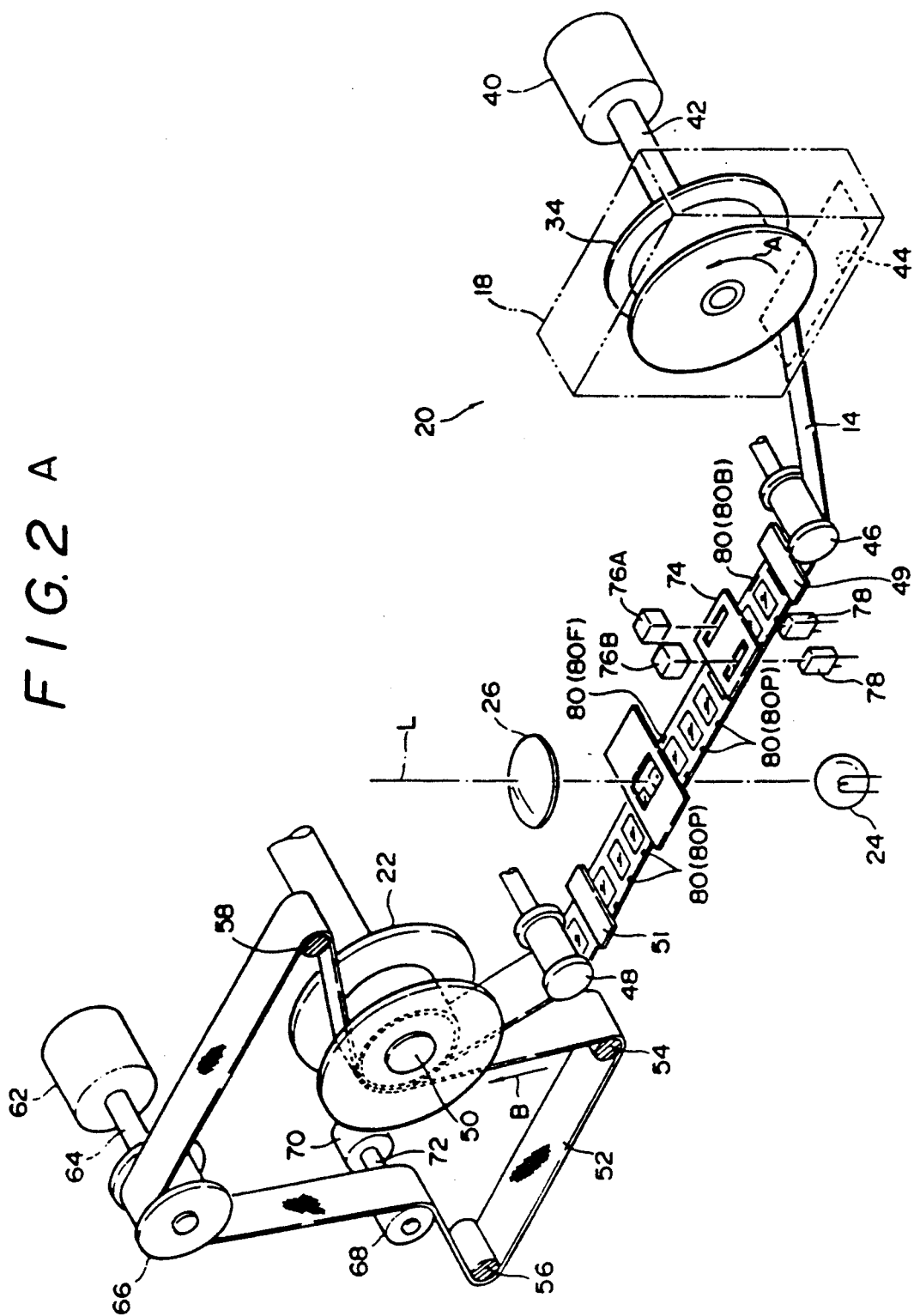
FIG. 2A is a perspective view of the vicinity of a cartridge loading section.

In FIGS. 2A and 2B, details of the loading section 20 are shown. A supply-side reel 34 (simply referred to as the reel 34, hereinunder) of the cartridge 18 is connected to the rotating shaft 42 of a supply motor 40 which, in turn, is connected to a controller 38 via a torque controlling unit 36. The supply motor 40 rotates the reel 34 with a constant torque in the direction in which the microfilm 14 is taken up (in the direction of arrow A in FIGS. 2A and 2B). An end of the microfilm 14 taken up by the reel 34 in the form of a roll is drawn out by a driving force of a loading roller of an unillustrated loading mechanism through an opening 44 provided in the cartridge 18. The end of the microfilm 14 is then wound around guide rollers 46, 48 and taken up by the takeup reel 22. Film detecting sensors 49, 51 for detecting the presence or absence of the microfilm 14 are disposed in the vicinity of the guide rollers 46, 48, respectively.

An outer periphery of an endless conveyor belt 52 is brought into contact with a shaft 50 of the takeup reel 22. This conveyor belt 52 is resilient and is wound around guide rollers 54, 56, 58. In addition, the conveyor belt 52 is also wound around a drive reel 66 secured to a rotating shaft 64 of a takeup motor 62 connected to the controller 38 via a speed controlling unit 60. Accordingly, the conveyor belt 52 is adapted to move in the direction of arrow B in FIGS. 2A and 2B and in an opposite direction thereto in correspondence with the rotation of the drive reel 66.

The microfilm 14 is clamped between the conveyor belt 52 and the shaft 50, and is takeup onto the shaft 50 or withdrawn therefrom in correspondence with the movement of the conveyor belt 52.

A driven roller 68 abuts the conveyor belt 52. This driven roller 68 is secured to a rotating shaft 72 of an encoder 70, whereby the driving state of the conveyor belt 52 can be detected by the encoder 70 by the number of pulses. The encoder 70 is connected to the controller 38.

A slit plate 74 which is arranged so that the longitudinal direction of two slits agrees with the transverse direction of the microfilm is disposed slightly closer to the guide roller 46 side than the optical axis L and is positioned between the guide roller 46 and the guide roller 48. A pair of light-receiving elements 76A, B are provided on the slit plate 74 in correspondence with the transversely opposite sides of the microfilm 14. A pair of LEDs 78 are provided on the opposite side of the microfilm 14 in correspondence with the pair of light-receiving elements 76A, B. A beam of light transmitted from each LED 78 and transmitted through the microfilm is received by each light-receiving element 76A, B. The light-receiving elements 76A, B and the LEDs 78 are respectively connected to the controller 38.

As shown in FIG. 3, blip marks 80P, B, F are on the transversely opposite side portions of the microfilm 14. The presence or absence of each blip mark 80P, B, F can be detected through a change in the quantity of light received by the light-receiving elements 76A, B. the blip marks 80P, B, F include, for instance, a page mark 80P indicating a page, a file mark 80F indicating a chapter, and a block mark 80B for indicating a part. Two file marks 80F and one block mark 80B are on an A-channel side of the microfilm 14 (upper side in FIG. 3), while page marks 80P are on a B-channel side (lower side in FIG. 3). The page marks 80P are in correspondence with each frame. The file marks 80F are each on a leading frame in each group of frames, i.e., to a beginning of each chapter, while the block marks 80B are each on a leading frame in each group of chapters, i.e., to a beginning of each part.

A dimension M between the light-receiving elements 76A, B and the optical axis L is fixed (75 mm in this embodiment). Accordingly, if the microfilm 14 is moved by a portion of the dimension M after an designated image frame 14A is detected by this light-receiving element 76, it is possible to position the frame 14A at the position of the optical axis L.

FIG. 2 shows that the controller 38 includes a microcomputer 99 which is constituted by a CPU 82, a RAM 84, a ROM 86, input/output ports 88, and buses 90 including data buses and control buses. A keyboard 92 is connected to the input/output ports 88.

A light-receiving element 76A on the A-channel side and a light-receiving element 76B on the B-channel side are respectively connected to determination circuits 100, 102 of the controller 38. The determination circuits 100, 102 determine the kind of the detected blip marks 80P, B, F by making a comparison between the sizes of the detected blip marks 80P, B, F with sizes of blip marks stored in advance in the RAM 84, and then respectively supplying the results of determination to a selection circuit 104. Connected to the selection circuit 104 are a block mark counter 106B, a file mark counter 106F, and a page mark counter 106P (these counters will be collectively referred to as the counters 106, hereinunder). The selection circuit 104 is adapted to select the kind of blip marks 80P, B, F inputted and output the results to the respective counters 106.

Each time a page mark 80P is detected, the counter 106 counts the page mark 80P in a preset unit of count and with a predetermined reset timing and with a predetermined reset value. For instance, if two pages are recorded in one frame of the microfilm 14, "2" is set as the unit of count, and the counter 106P counts in the manner of 2, 4, 6, . . . each time the page mark 80P is detected. Reset timing is a timing for effecting reset, e.g., resetting the count of the page marks 80P each time, a block mark 80B is detected. Reset value is an initial value for starting the count at the time of reset, e.g., "0" or "1" when the counting of the page marks 80P is started with "0" or "1".

It should be noted that if the file mark 80F and the page mark 80P are on the same image frame, a setting can be provided for canceling the count of that page mark 80P. This arrangement is effective when, for instance, there is no content on the first page of a chapter, and it is desirous to start counting from the next page. These settings, including the unit of count, the reset timing, and the reset value, are stored in the RAM 84. A counter control signal Cc is supplied from each input-/output port 88 to each counter 106. These counter control signals Cc include the unit of count, reset timing, and reset value that are used by the counters 106 for counting the blip marks 80P, B, F and are stored in the RAM 84. These counter control signals Cc thus control information on count by the counters 106. The values counted by the counters 106 are supplied to the input-/output ports 88. In addition, the signals that are output from the selection circuit 104 are also supplied to the input/output ports 88.

A description will now be given of the operation of this embodiment.

When the cartridge 18 is loaded, and the loading of the cartridge is determined by the on/off state of, for instance, a microswitch or the like, the loading mechanism operates, and the loading roller is brought into contact with the outer periphery of the microfilm 14 so as to cause the end of the microfilm 14 to be drawn out. The microfilm thus drawn out reaches the takeup reel 22 via the guide rollers 46, 48, and is clamped between the conveyor belt 52 and the shaft 50. As a result, the moving force of the conveyor belt 52 is transmitted to the microfilm 14, which is hence taken up onto the shaft 50. When the microfilm 14 is taken up onto the shaft 50 by a predetermined amount, the movement of the conveyor belt 52 is stopped to assume a standby state.

Next, count control information conforming to an object (a book or the like) recorded on the microfilm 14 is stored in the RAM 84. For example, in a case where one book has been recorded on a microfilm in which the contents are recorded in the order of pages, the page numbers are renewed for each chapter, and there are two parts, i.e., two groups of chapters, the cartridge 18 with the microfilm 14 accommodated therein is loaded, and predetermined information is input by the keyboard 92. In other words, in the aforementioned case, the input is effected such that the count of the page marks 80P is incremented by "1" at a time, the page mark 80P is reset to "1" each time the file mark (given to each chapter) 80F is detected, and the page mark 80P and the file mark 80F is reset to "1" each time the block mark (given to each part) 80B is detected. This information is stored in the RAM 84 as count controlling information for outputting the count control signal Cc.

Next, an image frame is designated through the keyboard 92. For instance, if numerals are input in the order of 2, 3, and 10, the controller 38 recognizes that the image frame to be retrieved is located at page 10 of the 3rd file in the 2nd block, and control of the positioning is commenced. As shown in FIG. 4, in this positioning control, first of all the takeup motor 62 is driven (e.g., forwardly). As the takeup motor 62 rotates, the conveyor belt 52 is moved, and at the same time the mircofilm 14 is taken up onto the shaft 50.

The light-receiving elements 76A, B detect each blip mark 80 passing between the LEDs 78 and the light-receiving elements 76A, B while the microfilm 14 is being conveyed.

If image retrieval is carried out in this state, as described before, the kinds of marks are determined by the determination circuits 100, 102 each time the blip mark 80 is detected, and the detection signal is supplied by the selection circuit 104 to a relevant counter 106. The relevant counter 106 sets a count value on the basis of the count control signal Cc stored in advance in the RAM 84.

Referring now to the flowcharts shown in FIGS. 3 and 5A to 5D, a description will be given of the details of control for determining a stopping position of the microfilm 14 and bringing it to a stop.

Figure 5:
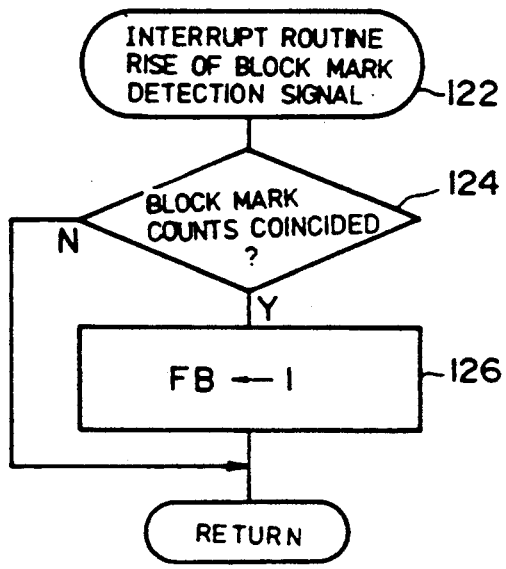
FIGS. 5A to 5D are flowcharts illustrating control of a stopping position of the microfilm.
Figure 5:
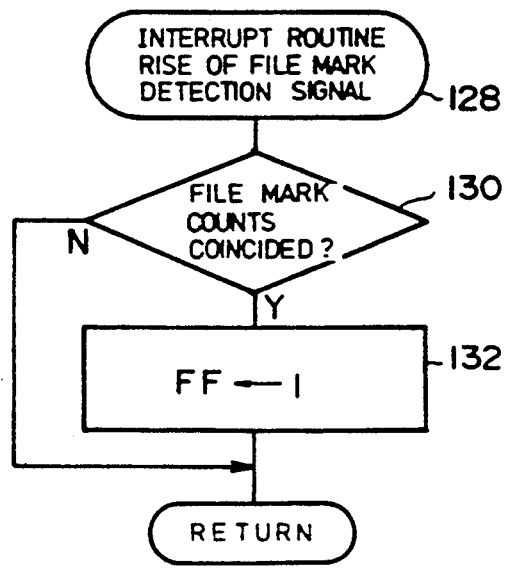

FIG. 5A shows a main routine. In Step 110, a determination is made on the basis of a detection signal whether or not two blip marks have been detected simultaneously. If two blip marks have been detected simultaneously, in Step 112, a determination is made as to whether or not the two blip marks are a combination of the block mark 80B and the page mark 80P. If they were a combination of a block mark 80B and a page mark 80P, since the first page of the block begins, in Step 114, the number of the page mark 80P is reset and the unit of count is set. For instance, in a case where the block mark is made to correspond to a part and the file mark to a chapter, the page mark 80P corresponding to each page is reset to "1" when the block mark 80B indicating a beginning of a part is detected, and counting is effect in such a manner that the count value of the page mark 80P is incremented by "1" at a time. Then, in Step 116, a determination is made as to whether or not a combination of a file mark 80F and a page mark 80P has been detected. If a combination has been detected, since an initial file is started, in Step 114, the number of the file mark is reset and the unit of count for counting the files is set. Since an initial page also begins, in Step 120, the number of the page mark 80P is reset and the unit of count for counting the pages is set.

If two blip marks were not detected in the aforementioned Step 110, this Step 110 is repeated. If NO is the answer in the aforementioned Step 112, i.e., when a combination of a file mark 80F and a page mark 80P is detected, an initial page of a file begins, so that, in Step 120, the number of the page mark 80P is reset and the unit of count for counting the pages is set. If NO is the answer in the aforementioned Step 116, Step 116 is repeated.

FIG. 5B shows an interrupt routine used when a detection signal of the block mark 80B has risen. In Step 124, a determination is made as to whether or not the count value of the block mark 80B detected coincides with a block mark designating count value designated through the keyboard 92. When they agree, in Step 126, a flag FB indicating the coincidence is set, and the detection of the designated block mark is stored in the RAM 84. If the block mark counts do not coincide in Step 124, the process returns to the main routine.

FIG. 5C shows an interrupt routine used when a detection signal of the file mark 80F has risen. In Step 130, a determination is made as to whether or not the count value of the file mark 80F detected coincides with the file mark designating count value designated through the keyboard 92. When a coincidence is obtained, in Step 132, a flag FF indicating the coincidence is set, and the detection of the designated file mark is stored in the RAM 84. If the file mark counts do not coincide, the process returns to the main routine.

Figure 5D:
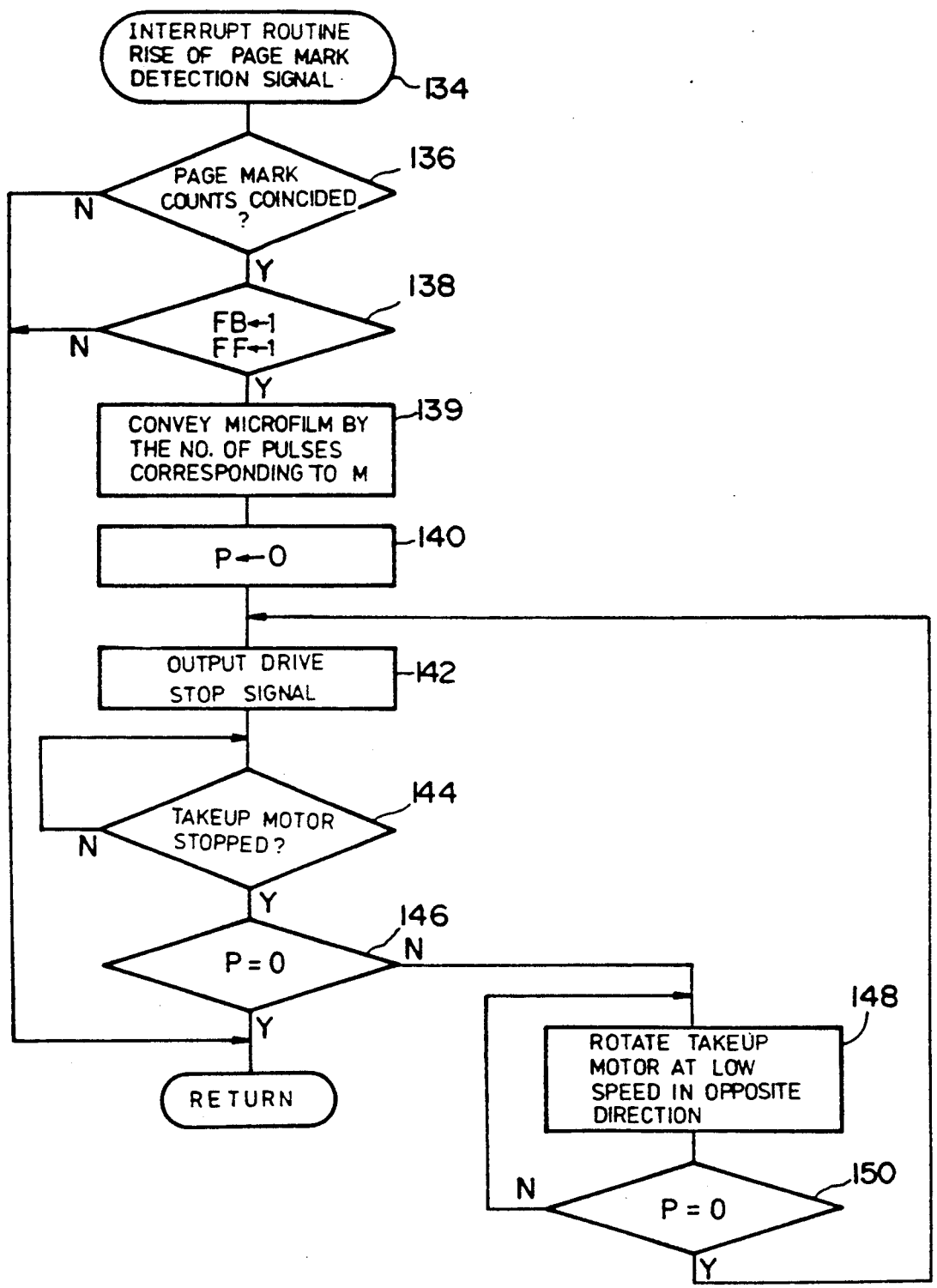

FIG. 5D shows an interrupt routine used when a detection signal of the page mark 80P has risen. In Step 136, a determination is made as to whether or not the count value of the page mark 80P detected coincides with the page mark designating count value set through the keyboard 92. When a coincidence is obtained, in Step 138, a determination is made as to whether or not the flag FB for the block mark 80B and the flag FF for the file mark 80F have already been set. If the flags for the block mark 80B and the file mark 80F have already been set, it means that the designated block, file, and page have been detected, so that, in Step 139, the microfilm 14 is conveyed by a portion of the number of pulses corresponding to the dimension M. Then, in Step 140, the number of pulses of the encoder 70 is set to "0", and, in Step 142, a drive stopping signal for stopping the driving of the takeup motor 62 is issued. In Step 144, a determination is made as to whether or not the takeup motor 62 has stopped. If it has stopped, a determination is made in Step 146 as to whether or not the number of pulses of the encoder 70 is "0". If it is determined that the number of pulses is not "0", it means that the microfilm 14 has slightly overrun, so that the takeup motor 62 is made to rotate reversely at a low speed in Step 148. In Step 150, a determination is made as to whether or not the number of pulses of the encoder 70 is "0", and when it is "0", the operation returns to Step 142, and a signal for stopping the driving of the takeup motor 62 is issued. If it is determined in Step 146 that the number of pulses is "0", it means that the image frame has stopped at a targeted position, so that this interrupt routine ends. If a determination is made in Step 144 that the takeup motor 62 has not stopped, this step is repeated until the takeup motor 62 stops. If it is determined in Step 150 that the number of pulses of the encoder 70 is not "0", i.e., it has not yet reached "0", it means that the time duration of the reverse rotation of the takeup motor 62 has been inadequate, and that the reverse traveling distance of the microfilm 14 has been inadequate. Consequently, the operation returns to Step 148, and the reverse rotation of the takeup motor 62 is continued. If NO is the answer in Step 136 and in Step 138, it means that the designated blip marks have not been detected in either case, so that this interrupt routine ends.

When the image frame to be retrieved has stopped at the targeted position, the positioning of the designated frame on the optical axis L is completed, so that the transmitted image obtained by the light source 24 is projected onto the screen 16.

If the retrieval with respect to the loaded cartridge 18 is completed, the entire microfilm 14 is taken up onto the cartridge 18, thereby completing the operation.

Thus, in this embodiment, it is possible to alter the count value and the like of each blip mark 80 in correspondence with the contents of images recorded on the microfilm 14, i.e., the set conditions of pages, chapters, and parts of a book or the like. Accordingly, at the time of image retrieval, it merely suffices to designate the page numbers and the like that are given to the document concerned and form a basis of the retrieval, with the result that the retrieval operation is facilitated.

It should be noted that in this embodiment an example has been shown in which the contents of a book are recorded on the microfilm 14 and retrieval is effected on the basis of the pages given in the book, the present invention is not limited to the same and is also applicable to a case in which a plurality of different documents are recorded on one microfilm 14. In this case as well, if the block mark 80B or the file mark 80F is given to a beginning of each document, it is possible to make the page numbers given in the documents and the count values of the page marks 80P to coincide with each other.

In addition, also in the case of recording two pages in each image frame (e.g., in cases where odd-numbered pages are recorded in left-hand columns and even-numbered pages in right-hand columns, or two consecutive pages in a book-opened state are recorded in one frame), in cases where the unit of count of the counters 106 is set to "2", and an odd number is designated as the page number, if "1" is added to the designated number in advance, it is possible to retrieve an image of the designated page.

As described above, the microfilm retrieval system in accordance with the present invention offers an outstanding advantage in that it is possible to set reset values and the units of count when counting the blip marks to desired numerical values, and retrieval is facilitated by counting the blip marks with the page numbers or the like given in a photographed object made to coincide with count values.

What is claimed is:

1. A microfilm retrieval system for retrieving a designated image frame by counting the number of blip marks on an elongated microfilm in correspondence with each of a plurality of image frames recorded on said microfilm from a set initial value in a set unit of count in accordance with a kind of said blip mark, said microfilm retrieval system comprising:
   specific mark detecting means for detecting at least one specific kind of blip mark which is provided at a predetermined position of said microfilm and is used for determining at least one of said initial value and said unit of count;
   means for detecting a combination of specific kinds of blip marks in cases where two or more specific kinds of blip marks are provided; and
   means for setting said initial value and said unit of count corresponding to the combination of specific blip marks detected by said means for detecting a combination of specific kinds of blip marks.

2. A microfilm retrieval system according to claim 1, wherein said specific kind of blip mark is a mark provided in correspondence with a leading frame of a group including a plurality of said image frames.

3. A microfilm retrieval system according to claim 1, wherein said initial value is equivalent to a page number of an image recorded in a leading frame of a group including a plurality of said image frames.

4. A microfilm retrieval system according to claim 1, wherein said unit of count is equivalent to the number of pages of an image recorded in one image frame of a group including a plurality of said image frames.

5. A microfilm retrieval system according to claim 1, wherein said initial value and said unit of count are set when said specific kind of blip mark is detected.

6. A microfilm retrieval system for retrieving a designated image frame by counting the number of first marks on an elongated microfilm in correspondence with each of a plurality of image frames recorded on said microfilm and the number of second marks each correspondingly assigned to a leading frame of each group obtained by classifying said image frames into a plurality of groups, said microfilm retrieval system comprising:

mark detecting means for detecting said first mark and said second mark and outputting a signal;

means for counting said marks in accordance with kinds of said marks from a set initial value in a set unit of count, respectively, on the basis of the signal outputted from said mark detecting means;

means for determining whether or not a mark given said second mark has been detected on the basis of the signal outputted from said mark detecting means; and means for setting in said counting means said initial value and said unit of count at the time of counting said first marks when it is determined by said determining means that a frame given said second mark has been detected.

7. A microfilm retrieval system according to claim 6, wherein said setting means comprises means for storing a plurality of said initial values and a plurality of said units of count.

8. A microfilm retrieval system according to claim 6, wherein said unit of count is a value equivalent to the number of pages of an image recorded in one frame of a group to which said detected frame given said second mark belongs.

9. A microfilm retrieval system according to claim 6, wherein said initial value is a value equivalent to the page number given to an image recorded in a leading frame of said each group.

10. A microfilm retrieval system according to claim 6, wherein said initial value is either 0 or 1.

11. A microfilm retrieval system according to claim 6, further comprising: means for inputting count data for designating said image frame to be retrieved; and means for stopping said image frame corresponding to coinciding count data obtained when it is detected that said count data and data counted by said counting means have coincided.

12. A microfilm retrieval system according to claim 11, further comprising means for stopping said image frame to be retrieved at a predetermined position by moving said image frame at a low speed in an opposite direction to a direction of movement which took place immediately before the stopping of said image frame, so as to correct an overrun of said image frame occurring when said image frame is stopped.

13. A microfilm retrieval system for retrieving a designated image frame by counting the number of first marks on an elongated microfilm in correspondence with each of a plurality of image frames recorded on said microfilm, the number of second marks each correspondingly assigned to a leading frame of each medium group obtained by classifying said image frames into a plurality of medium groups, and the number of third marks each correspondingly assigned to a leading frame of each large group obtained by classifying said medium groups into a plurality of large groups, said microfilm retrieval system comprising:

mark detecting means for detecting said first mark, said second mark, and said third mark and outputting a signal;

means for counting said marks in accordance with kinds of said marks from a set initial value in a set unit of count, respectively, on the basis of a signal outputted from said mark detecting means;

means for determining whether or not a mark given either of said second mark or said third mark and has been detected on the basis of the signal outputted from said mark detecting means; and means for setting in said counting means said initial value and said unit of count at the time of counting said first marks when it is determined by said determining means that a frame given either of said second mark or said third mark has been detected.

14. A microfilm retrieval system according to claim 13, wherein said setting means sets in said counting means said initial value and said unit of count for counting said first marks and said second marks when it is determined by said determining means that a frame given said third mark has been detected, while said setting means sets in said counting means said initial value and said unit of count for counting said first marks when it is determined by said determining means that a frame given said second mark has been detected.

15. A microfilm retrieval system according to claim 13 or 14, wherein said setting means comprises means for storing a plurality of said initial values and a plurality of said units of count.

16. A microfilm retrieval system according to claim 13 or 14, wherein said unit of count is a value equivalent to the number of pages of an image recorded in one frame of a group to which said detected frame given said second mark belongs.

17. A microfilm retrieval system according to claim 13 or 14, wherein said initial value is a value equivalent to the page number given to an image recorded in a leading frame of said each group.

18. A microfilm retrieval system according to claim 13 or 14, wherein said initial value is either 0 or 1.

19. A microfilm retrieval system according to claim 13, further comprising: means for inputting count data for designating said image frame to be retrieved; and means for stopping said image frame corresponding to coinciding count data obtained when it is detected that said count data and data counted by said counting means have coincided.

20. A microfilm retrieval system according to claim 13, further comprising means for stopping said image frame to be retrieved at a predetermined position by moving said image frame at a low speed in an opposite direction to a direction of movement which took place immediately before the stopping of said image frame, so as to correct an overrun of said image frame occurring when said image frame is stopped.

* * * * *